United States Patent [19]
Hanson

[11] 3,860,958
[45] Jan. 14, 1975

[54] OFFSET READ/WRITE MAGNETIC RECORDING SYSTEM WITH GUARD BAND

[75] Inventor: Charles C. Hanson, Rochester, Minn.

[73] Assignee: International Business Machines Corporation, Armonk, N.Y.

[22] Filed: Feb. 27, 1973

[21] Appl. No.: 336,391

[52] U.S. Cl. .................................. 360/57, 360/118
[51] Int. Cl. .......................... G11b 5/02, G11b 5/46
[58] Field of Search ............... 340/174.1 C, 174.1 F; 179/100.2 CA, 100.2 D; 360/57, 77, 78, 118

[56] References Cited

UNITED STATES PATENTS 3,126,535 3/1964 Streeter ........................ 340/174.1 C

*Primary Examiner*—Vincent P. Canney
*Assistant Examiner*—Stewart Levy
*Attorney, Agent, or Firm*—Donald F. Voss

[57] ABSTRACT

A magnetic read/write head having a single gap is mounted to a carriage positionable to locate the head at selected tracks on a magnetic disk by means of a lead screw and stepping motor. The pitch of the lead screw requires a multiple number of steps to move the read/write head one track position. Control circuitry is provided whereby the read/write head is either in the read or the write mode. A write operation is performed by first switching into the read mode and moving the head to the desired track. The stepping motor is then operated to offset the head to the right of the desired track. The sector identification is read with the head in the offset position and immediately after reading the identification, the operation is switched into the write mode to perform a D.C. erase of the sector. Upon reaching the end of the sector, the operation switches to the read mode and during the remainder of the revolution, the stepping motor offsets the head to the left of the desired track. The erased sector is then relocated by reading the identification for that sector and the operation again switches into the write mode and the desired data is written into the sector over the previously recorded data, if any, with a write current, i.e., using non-return to zero recording, which upon recording the new data destroys the old data. The head is then returned to the nominal position, i.e., not offset, and the operation switches into the read mode so as to read the written data and verify that the data has been properly written.

5 Claims, 6 Drawing Figures

PATENTED JAN 14 1975

3,860,958

SHEET 4 OF 4

OFFSET READ/WRITE MAGNETIC RECORDING SYSTEM WITH GUARD BAND

BACKGROUND OF THE INVENTION

1. Field of the Invention

This invention relates to a method and apparatus for recording and reading data on magnetic media and more particularly to such method and apparatus where the recording head has a single gap which is used for both the reading and recording operations and still more particularly, to such method and apparatus where there is relative movement between the head and the magnetic media so as to selectively position the reading and recording head with respect to the magnetic media.

2. Description of the Prior Art

Heretofore, it has been the practice to either use a multigap magnetic head or a servo system to insure that the magetic head would read only the desired data. The multigap read head has one central gap for performing the read/write operation and gaps disposed to either side of the central gap for performing a tunnel erase operation. The tunnel erase provides a guard band on both sides of the data track. Thus, when a magnetic read head is positioned to read the data track, it can be positioned within a given tolerance and the correct data will still be read. Additionally, in systems where the magnetic disk media is interchangeable, the guard band provides the necessary tolerance to account for any dimensional differences which may exist due to the fact that the data can be written on one machine and read by another machine.

Magnetic recording systems using a track servo following control can get by with a magnetic read head having a single gap, however, the magnetic media is usually not interchangeable from machine to machine, i.e., it is fixed, and, of course, the servo system is required to insure that the head is maintained in a precise position relative to the data track.

The multigap magnetic head and the track following servo system perform adequately, however, they are relatively expensive. There is a need for a less expensive magnetic recording system in a lower performance environment. The present invention is less expensive than the multigap head system because it employs a magnetic head with only a single gap and does not require a separate erase coil. It is also less expensive than the track following servo system because it does not require a servo system and the head positioning mechanism for positioning the head to the desired track, can have greater tolerances and thereby be less expensive. The present invention forms the guard band by offsetting the head in one direction during an erase operation and in another direction during the write operation. The read operation takes place with the head in a non-offset position.

SUMMARY

The principal objects of the invention are to provide a magnetic recording system with a single gap read/write head which is: (a) relatively inexpensive; (b) operates with interchangeable magnetic media; and (c) facilitates the use of a magnetic head positioning device having substantial tolerances.

The foregoing objects are achieved by providing controls in the magnetic recording system which offset the magnetic head to the right of the desired track and using a portion of a revolution of the magnetic media to erase that track and thereafter, offsetting the magnetic head to the left of the desired track to write data in the track. The written data is then read by positioning the head in the nominal position relative to the desired track. This arrangement effectively provides a guard band on either side of the track to account for tolerances in the magnetic head positioning device and for different tolerances between machines used for recording and reading data on the magnetic media.

Figure 1:
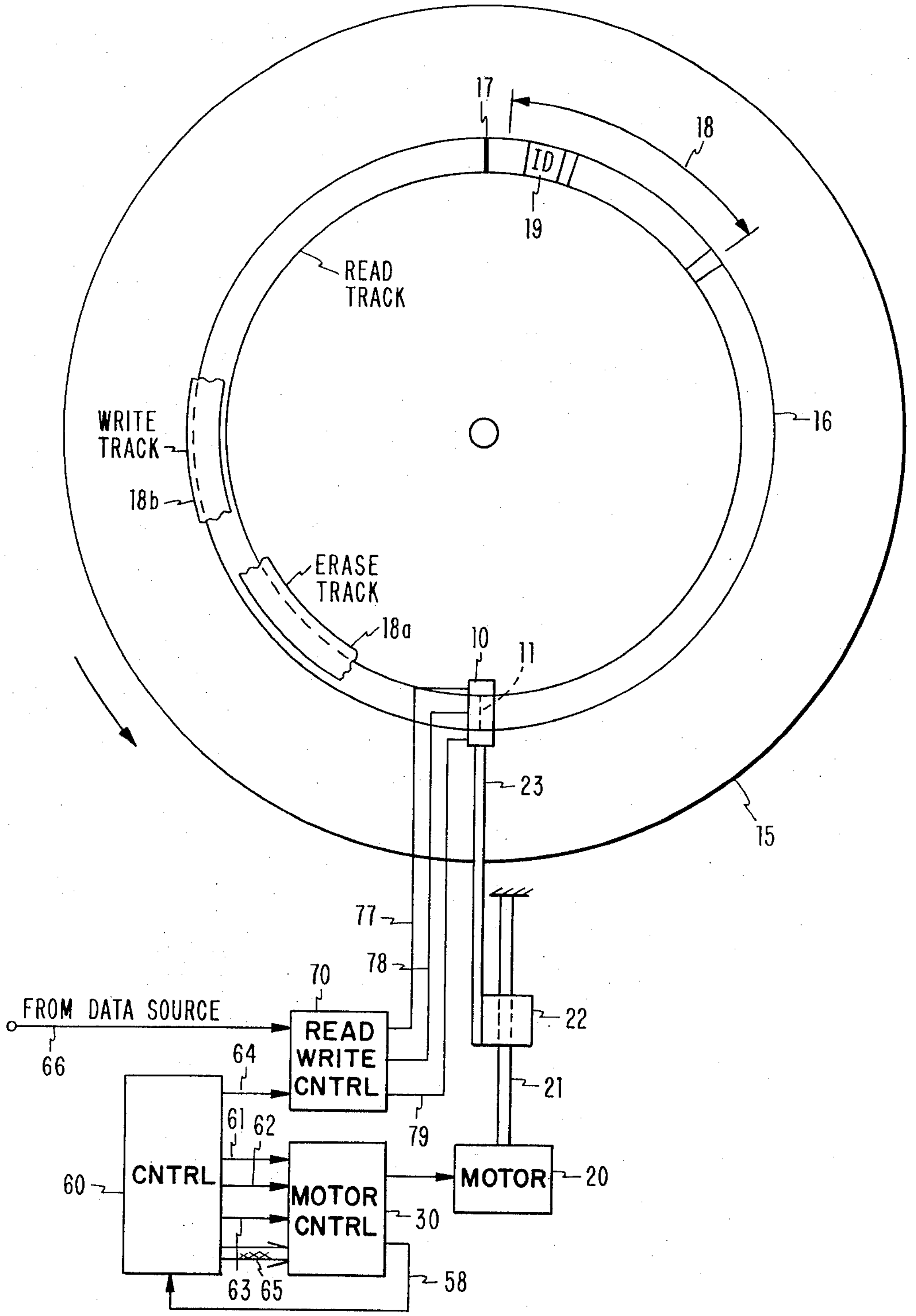
FIG. 1 is a schematic diagram illustrating the invention.
Figures 2B, 5:
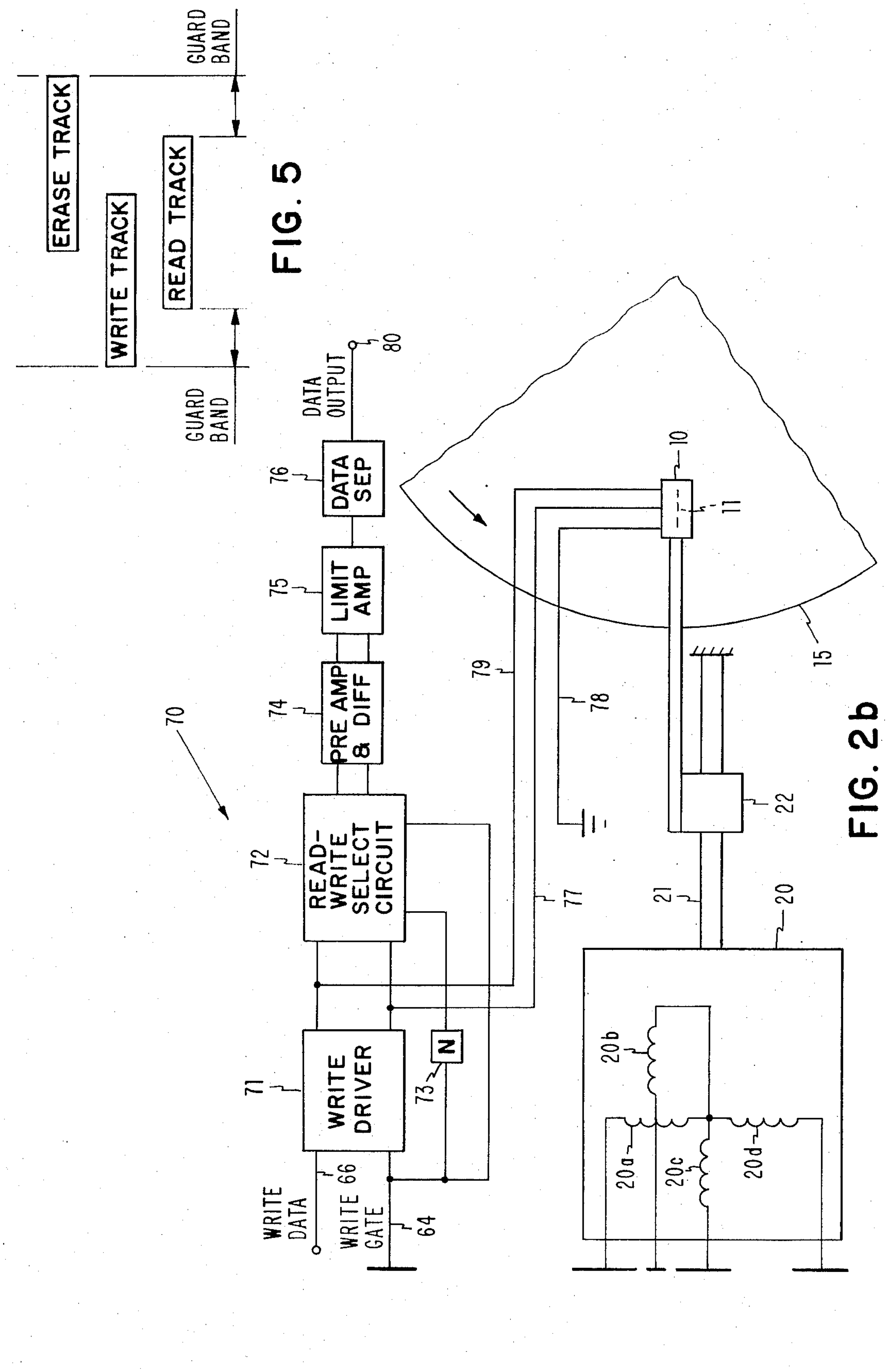
Figures 3, 4:
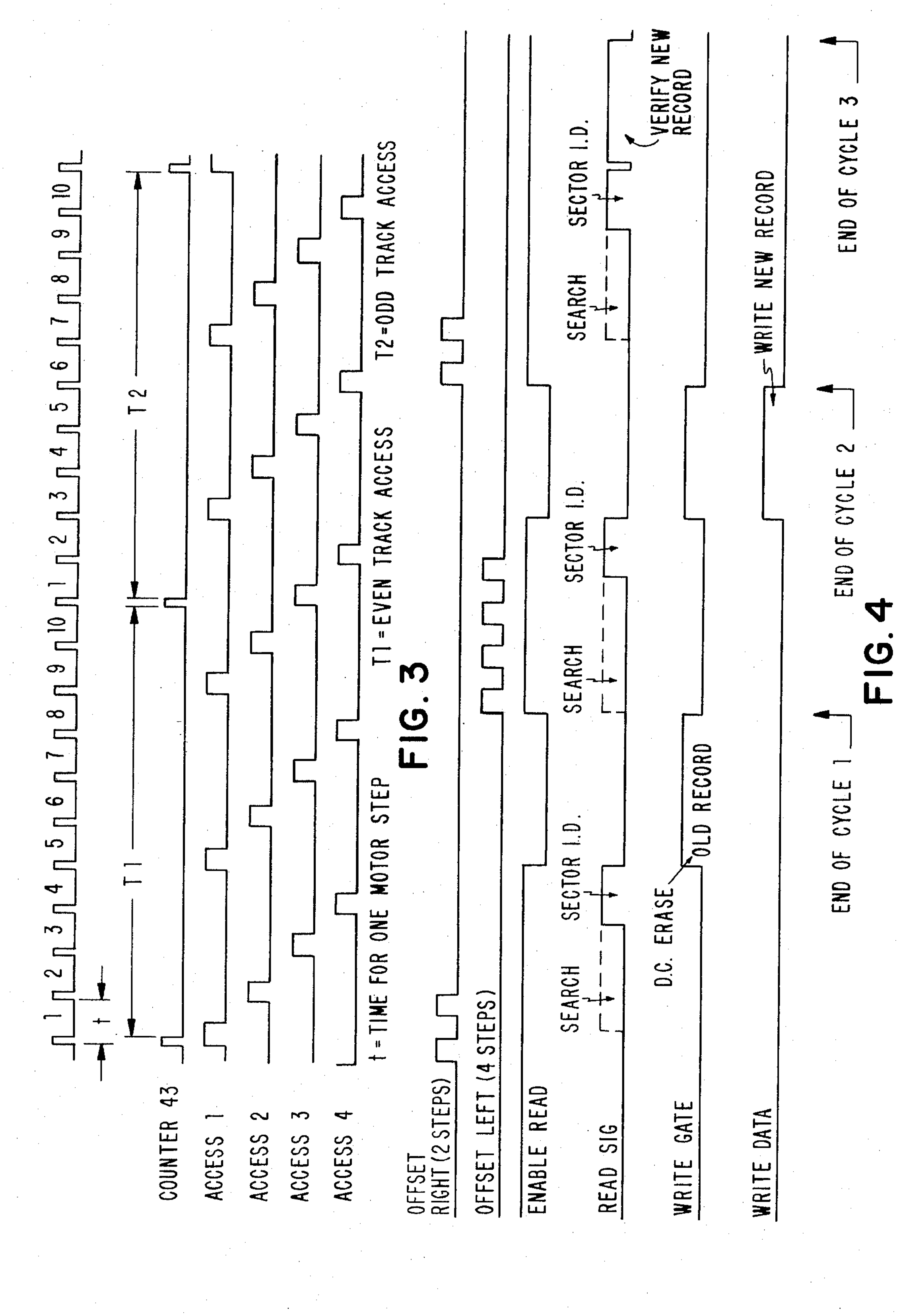

FIGS. *2a* and *2b* taken together with FIG. *2a* disposed to the left of FIG. *2b*, show the details of the control apparatus illustrated in block form in FIG. 1;

FIG. 3 is a waveform diagram illustrating the pulses used for operating the stepping motor to access the magnetic head to the desired track;

FIG. 4 is a waveform diagram showing the signals for controlling the access mechanism to offset the magnetic head and for performing read and write operations; and, FIG. 5 is a schematic diagram illustrating the position of the magnetic head in the offset write position, the read position, and the offset erase position.

DESCRIPTION

With reference to the drawings and particularly to FIG. 1, the invention is illustrated as including a magnetic read/write head 10 having a read/write gap 11 for recording and reading data on rotatable magnetic disk 15. Magnetic disk 15 is a conventional magnetic disk driven at a predetermined speed by a well known drive mechanism, not shown, to rotate counterclockwise. Magnetic disk 15 can be either fixed or removable. The present invention works equally well with either arrangement. The data to be recorded on disk 15 is recorded in concentric tracks as illustrated by track 16 shown in exaggerated form. The magnetic disk 15 may have a diameter for example, of 14 inches. The width of track 16 is equal to the width of the read/write gap 11 and in this particular example, is equal to 0.006 inches. Thus, it is seen that the width of track 16 is grossly exaggerated.

Magnetic head 10 is mounted to carriage 22 by a cantilevered arm 23. The mounting arrangement is shown schematically in that the particular arrangement is not significant to the invention and is conventional. Carriage 22 is mounted on a lead screw 21 turned by stepping motor 20. Carriage 22 moves forwards or backwards depending upon the direction of rotation of lead screw 21. Stepping motor 20 can be driven in either a clockwise or counterclockwise direction to rotate lead screw 21 in either of these directions and thereby move carriage 22 backwards or forwards to the desired track position. When operating in either the clockwise or counterclockwise direction, motor 20 rotates a multiple number of steps in order to move magnetic head 10 one track position. In this particular example, ten steps are required to move carriage 22 and in turn magnetic head 10 one track position.

The rotation of motor 20 is controlled by motor control 30 which provides control signals for operating motor 20 to position magnetic head 10 to the desired track and to offset it relative to the desired track.

Motor control 30 is in turn under control of control unit 60. Control unit 60 provides Seek Track, Offset Right, and Offset Left control signals on conductors 61, 62 and 63 respectively which are applied to motor control 30. Track positioning information is transmitted from control 60 to motor control 30 over bus 65. After magnetic head 10 is positioned to the selected track, motor control 30 sends a signal back to control 60 on conductor 58. Control unit 60 also provides a Write Gate signal on conductor 64 to read/write control 70. Read/write control 70 provides signals to magnetic head 10 over conductors 77, 78 and 79 respectively.

In this particular example, each track such as track 16, has a start or index position 17 and starting with this index position, a track is divided into a number of arcuate sectors 18 of equal length. The index mark 17 is used for generating an index pulse in response to being sensed by a transducer not shown. Separate index transducers are used for generating the index pulses. A gap between the index mark 17 and the first sector 18 is provided to allow for variations in the position of the index pulse. A sector identification (ID) 19 is located at the beginning of each sector and identifies the particular sector. The remaining portion of the sector consists of the data field into which data is recorded.

Magnetic head 10 is positioned to the desired track in response to control 60 providing a Seek Track control signal on conductor 61 and the desired track position on bus 65 to motor control 30. Motor control 30 then provides the necessary pulses to motor 20 for rotating lead screw 21 in the proper direction to move carriage 22 so as to position magnetic head 10 to the desired track.

With the magnetic head 10 positioned at the desired track location, a sector of data can be written. In order to write a sector of data, control 60 provides an Offset Right signal to motor control 30. Motor control 30 provides a signal to motor 20 to cause the same to rotate two steps and thereby increment magnetic head 10 inwardly toward the center of disk 15 a distance of 0.002 inches. With magnetic head 10 in this position, the operation is set into the read mode and the sector ID 19 is read. Immediately after reading the sector ID 19, the operation switches into the write mode and a DC erase is performed over the remaining portion of the sector 18, i.e., the data field in sector 18 is erased. The offset erased sector is represented by erase track **18*a* shown displaced from sector 18 for purposes of clarity. The operation then switches into the read mode and control 50 provides an Offset Left signal to motor control 30. This signal causes motor 20 to rotate four steps so as to move carriage 22 and in turn magnetic head 10 outwardly away from the center of disk 15 four steps so that magnetic head 10 is offset from track 16 0.002 inches. The sector in which data is to be written is relocated by reading the sector ID 19 and data is then written into the sector in response to a Write Gate signal from control 60 applied to read/write control 70 via conductor 64. The data written comes from a data source, not shown, via conductor 66 and is represented by write track 18*b*. It should be noted that write track 18*b* overlies a portion of erase track 18*a* and both erase track 18*a* and write track 18*b* overlie read track 16 within sector 18. However, to avoid confusion, the erase track 18*a* and write track 18*b* are shown as being angularly displaced from sector 18**.

During the remainder of the revolution, control 60 provides an Offset Right signal to motor control 30 to cause motor 20 to rotate so as to move carriage 22 inwardly toward the center of disk 15 0.002 inches and thereby position magnetic head 10 directly over track 16. This is called the nominal position of magnetic head 10. Magnetic head 10 identifies the sector 18 by reading the ID 19 and then reads the data which had been written in sector 18, i.e., in write track **18*b*. The data read from sector 18 is then verified by apparatus not shown to insure that the data had been properly written into sector 18**.

Control 60 shown in block form in FIGS. 1 and **2*a*, can be a control unit attached to a computer system or it could be a stand alone control unit of the type well known in the art. The Seek Track control signal provided by control unit 60 on conductor 61 is applied to AND circuit 45 of motor control 30. The Seek Track control signal enables AND circuit 45 to pass a pulse from track access oscillator 42. The pulse passed by AND circuit 45 is applied to OR circuit 50 which controls the advance of counter 51. Counter 51 is a four bit up and down counter. Counter 51 counts up under control of OR circuit 48 and down under control of OR circuit 49. Counter 51 has four outputs which are connected to drivers 52, 53, 54 and 55 respectively. The output of drivers 52, 53, 54 and 55 are connected to windings 20*a*, 20*b*, 20*c* and 20*d* respectively of motor 20. The sequence in which the windings 20*a*, 20*b*, 20*c* and 20*d* are energized, determines the direction of rotation of motor 20 and in turn of lead screw 21. The number of steps made by motor 20 is determined by the number of times drivers 52, 53, 54 and 55 are energized so as to energize the corresponding windings 20*a*, 20*b*, 20*c* and 20*d*. This, of course, is determined by the number of times that counter 51 is advanced. In this example, pulses from oscillator 42 are permitted to advance counter 51 so as to provide sequential access pulses for drivers 52, 53, 54 and 55 as shown in FIG. 3**.

The up and down control signals for counter 51 essentially come from compare circuit 33 which compares the output of up-down counter 31 containing the present track number with the output of register 32 containing the desired track number. The desired track number is fed into register 32 from control 60 via bus 65. Compare circuit 33 has a count up output connected to AND circuit 40 and a count down output connected to AND circuit 41.

The outputs of AND circuits 40 and 41 are connected to delay circuits 38 and 39 respectively which have their outputs connected to the down and up inputs of present track number counter 31. AND circuits 40 and 41 also have an input connected to the output of next track select counter 43 which generates an output signal in response to receiving ten pulses from track access oscillator 42.

The output signal from counter 43 is also applied to AND circuits 34 and 35 which are appropriately conditioned by the count up and count down outputs from compare circuit 33. Hence, if compare circuit 33 provides a count up signal, AND circuit 34 upon receiving a signal from counter 43 will pass a signal for setting latch 36. On the other hand, if compare circuit 33 provides a count down signal, AND circuit 35 in response to receiving a signal from counter 43 will pass a signal for setting latch 37. The set outputs of latches 36 and 37 are connected to control counter 51 via OR circuits 38 and 49 respectively. OR circuits 48 and 49 control counter 51 in the count up and count down modes respectively.

Latches 36 and 37 are reset by a signal from single shot multivibrator 44 which has a shorter period than delay circuits 38 and 39. Single shot multivibrator 44 is fired by the output signal from counter 43. By this arrangement counter 51 is advanced ten times in either the count up or count down mode depending upon whether latch 36 or 37 is set. This causes the magnetic head 10 to be moved one track by motor 20. If magnetic head 10 is not as yet at the desired track position, compare 33 will still have a count up or count down output and counter 51 will be advanced ten more times before counter 43 generates an output signal. This causes counter 31 to be updated and the operation repeats until magnetic head 10 is at the desired track position as determined by OR circuit 56 and inverter 57. When the value in counter 31 equals the value in register 32, magnetic head 10 is at the desired track position and compare 33 does not have a count up or a count down output. This is detected by OR circuit 56 and inverter 57. Inverter 57 signals control 60 that magnetic head 10 is at the desired track position.

Counter 51 is also controlled in the count up mode when OR circuit 48 has an input from single shot multivibrator 46. Single shot multivibrator 46 fires in response to an Offset Right signal from control 60 via conductor 62. The output of OR circuit 49 also controls counter 51 in a count down mode in response to a signal from single shot multivibrator 47. Single shot multivibrator 47 fires in response to an Offset Left signal from control 60 via conductor 63. It should be noted that the outputs of single shot multivibrators 46 and 47 are also applied to OR circuit 50 and in this manner, provide an alternate way for advancing counter 51.

In addition to providing signals to motor control 30, control 60 provides a Write Gate control signal on conductor 64 to read/write control 70. Read/write control 70 functions so that the magnetic head 10 is either in a read or a write mode at all times. The read and write modes are exclusive. Further, when in the write mode, if data is not supplied on conductor 66, magnetic head 10 performs a D.C. erase with respect to the magnetic media of disk 15 so as to erase any data passing relative to the magnetic head. The Write Gate signal from control 60 is applied over conductor 64 to write driver 71, inverter 73 and read/write select circuit 72. The write driver 71 and read/write select circuit 72 are connected to the magnetic head by conductors 77, 78 and 79. Conductors 77 and 79 are connected to opposite ends of the read/write coil located in magnetic head 10. Conductor 78 is connected between ground potential and a point between the read/write coils inside the magnetic head 10. The read/write select circuit 72 is in a read mode during the absence of a Write Gate signal from control 60 because inverter 73 provides a control signal to read/write select circuit 72.

A Write Gate signal from control 60 places read/write select circuit 72 in the write mode. By this arrangement, data is written in a track on disk 15 when in a write mode, if data is supplied to conductor 66. Data bits are recorded on the disk surface as changes of flux. When in a read mode, read signals are passed from the magnetic head 10 whenever a change of flux on the disk surface is detected. The read signals are passed to a preamplifier and differentiater circuit 74 by the read/write select circuit 72. The outputs from circuit 74 are applied to limit amplifier 75 which develops a train of positive pulses which in turn are applied to data separator 76. The data pulses from data separator 76 appear at terminal 80 which can be connected to any suitable utilization device such as a computer system, not shown.

Figure 2A:
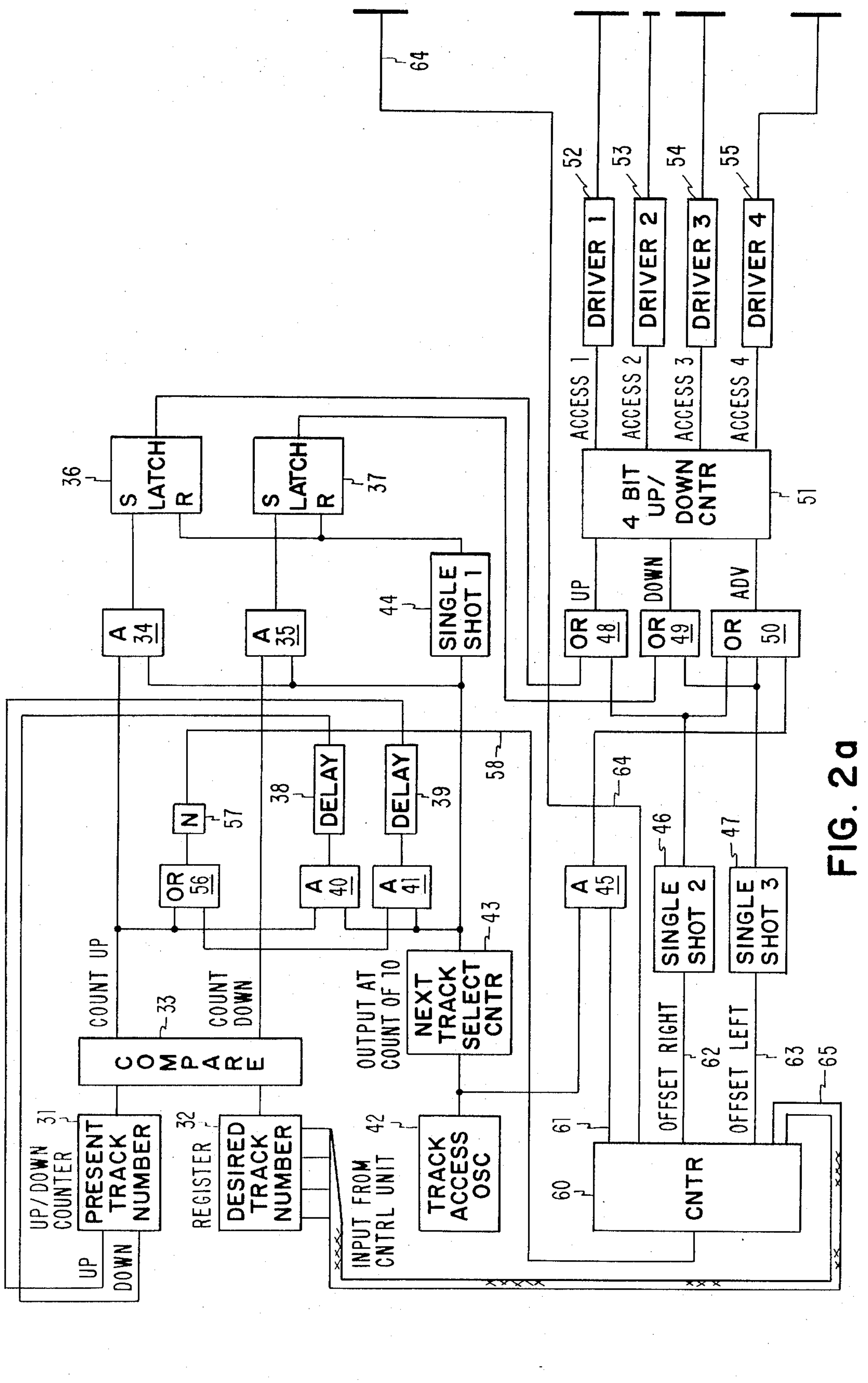

A detailed description of the operation of the invention will be given in connection with FIGS. 2*a*, 2*b* and FIG. 4. The first step is to position magnetic head 10 over the desired track. To accomplish this step, control 60 loads register 32 with data identifying the desired track location. The data representing the desired track location in register 32 is compared with the data indicating the present track location in up down counter 31. Compare circuit 33 provides either a count up or a count down signal depending upon whether the desired track number is greater or less than the present track number. Of course, if the magnetic head 10 is already at the desired track, compare circuit 33 will not have an output. Assuming that the magnetic head is not at the desired track, compare circuit 33 will have an output. Hence, either latch 36 or latch 37 will be set to pass a signal via either OR circuit 48 or OR circuit 49 to set counter 51 either into the count up or count down mode. Counter 51, while in either the count up or count down mode, is advanced by pulses passed by AND circuit 45. AND circuit 45 is conditioned by the Track Seek signal coming from control 60 via conductor 61 and passes pulses from track access oscillator 42.

As counter 51 is advanced, the outputs access 1 – access 4 are energized in sequence to energize corresponding drivers 52–55. Drivers 52–55 energize the associated windings 20*a*–20*d* of stepping motor 20 to rotate the lead screw 21. When motor 20 has made ten steps, magnetic head 10 moves the distance of one track. This fact is recorded in the present track number counter 31 as the next track select counter 43 generates an output signal in response to receiving ten pulses from track access oscillator 42. The signal from counter 43 also fires single shot multibrator 44 which resets latches 36 and 37. If the present track number is not equal to the desired track number, compare 33 continues to provide a count up or count down output signal to condition AND circuits 40 and 41 and thereby pass the output signal from counter 43 to delays 38 and 39. The length of the signal from counter 43 is greater than the delay time of the delays 38 and 39 and greater than the period of the single shot multibrator 44. Hence, the present track number counter 31 has incremented up or down depending upon which of the AND circuits 40 or 41 is conditioned. The operation just described continues until magnetic head 10 is positioned to the desired track. When this occurs, compare circuit 33 does not have an output and consequently OR circuit 56 does not have an output. However, inverter 57 will have an output which indicates to control 60 that head 10 is at the desired track. The seek track signal is present for the entire time that it takes to position the magnetic head 10 to the desired track.

In response to the magnetic head 10 being positioned to the desired track, control 60 generates an Offset Right signal for firing single shot multibrator 46 and the signal therefrom is passed by OR circuit 48 to set counter 51 into the count up mode and passed by OR circuit 50 to advance the counter 51 one step. This action is illustrated in FIG. 4. Motor 20 is responsive to the change in the count value in counter 51 and steps the magnetic head 10 inwardly toward the center of disk 15, one step or 0.001 inches. Control 60 issues another Offset Right signal to fire single shot multivibrator 46 again and counter 51 is again advanced in the count up mode to cause motor 20 to advance magnetic head 10 inwardly another 0.001 inches. It should be noted that during this operation, control 60 has not provided a Write Gate signal, and therefore, magnetic head 10 is operating in the read mode.

With magnetic head 10 in the read mode and offset 0.002 inches from the nominal position of the read track 16, the desired sector 18 is located by reading the track ID 19. In response to detecting the track ID, control 60 provides a Write Gate signal on conductor 64 to energize write driver 71. No data is provided on conductor 66 and write driver 71 energizes the write coil in magnetic head 10 to effect a D.C. erase of the data field in sector 18. The Write Gate is then turned off by control 60 and during the remainder of the revolution, control 60 provides a first Offset Left pulse on conductor 63 to fire single shot multivibrator 47. The pulse from single shot multivibrator 47 is passed by OR circuit 49 to set counter 51 into the count down mode and is passed by OR circuit 50 to advance counter 51 while in the count down mode. The output of counter 51 causes motor 20 to make one step so as to move magnetic head 10 0.001 inches outwardly away from the center of disk 15. Control 60 provides three more successive Offset Left pulses so as to sequentially advance counter 51 in the count down mode and thereby sequentially cause the motor 20 to step and in turn cause magnetic head 10 to be stepped three more times a distance of 0.001 inches outwardly away from the center of disk 15 so as to offset magnetic head 10 to the left of the nominal or read track position by a distance of 0.002 inches. It is seen that it is necessary to step the magnetic head 10 four times to bring it into the write track position **18*b* because it had been stepped twice to the right from the nominal or read track position to assume the erase track position 18*a*.**

It will be recalled that the Write Gate signal had been turned off by control 60 and therefore the magnetic head 10 is being operated in the read mode and while in this mode, and with the head offset to the write track position **18*b*, the sector ID 19 is again located. After locating and reading the sector ID 19, the operation switches into the write mode in response to a Write Gate signal from control 60. At this time, data is supplied from a suitable source on conductor 66 to write driver 71. Write driver 71 causes the data to be written into the data field of sector 18 and upon reaching the end of the sector, control 60 turns off the Write Gate. Then, during the remainder of the revolution of disk 15, control 60 provides two successive Offset Right pulses to successively fire single shot multivibrator 46 and successively advance counter 51 in the count up mode so as to successively step motor 20 twice which in turn steps magnetic head 10 inwardly 0.002 inches to bring it into the nominal position over read track 16. The sector ID 19 is again located and the data written in sector 18** is read and verified to determine if the data had been properly written during the write mode operation.

From the foregoing and as graphically illustrated in FIG. 5, it is seen that the magnetic read/write head 10 is offset to the right of the nominal track position a predetermined amount to first perform a track or sector erase. The magnetic head is then offset to the left of the nominal or read track position and data is written into the area that had been erased and over the old data, if any, underlying the magnetic head while in this offset position. The read head is then positioned to the nominal or read track position so as to read the data recorded in the track. By this arrangement, the positioning of the read head to the nominal or read track position can be off within a given tolerance and still read the proper data. The tolerance of course can vary and this particular example is equal to ±0.002 inches. Of course, the amount of offset can be varied without departing from the spirit of the invention. In some instances it may be more desirable to offset in each direction only one step or 0.001 inches. In other instances, it may be desirable to offset the erase track, i.e., offset to the right, by a greater or smaller distance than the write track, i.e., the offset to the left.

What is claimed is:

1. A method for controlling the operation of a single gap magnetic transducer for reading and writing data in tracks on magnetic media comprising the steps of:

positioning said transducer off-set to one side of the nominal track position on said magnetic media to overlie a portion of said nominal track and a portion adjacent thereto;

energizing said transducer in said off-set to one side position to erase data from said magnetic media;

positioning said transducer off-set to the other side of said nominal track position, and energizing said transducer in said off-set to the other side position to write data on said magnetic media partly within said nominal track and partly adjacent thereto.

2. The method of claim 1 further comprising the steps of:

positioning said transducer to said nominal track position on said magnetic media;

operating said transducer in said nominal track position to read data recorded partly within said nominal track on said magnetic media.

3. Apparatus for controlling the operation of a single gap magnetic transducer for reading and writing data in tracks on magnetic media comprising:

transducer positioning means for incrementally moving said transducer;

control means connected to provide control signals for operating said transducer positioning means, said control means providing a first control signal to cause said positioning means to move said transducer off-set to the right of a nominal track position; and a second control signal to cause said positioning means to move said transducer off-set to the left of a nominal track position; and transducer control means for energizing said transducer positioned off-set to the right of said nominal track position to erase data on said magnetic media partly in said nominal track and partly in the area adjacent thereto and for energizing said transducer positioned off-set to the left of said nominal position to write data partly in said nominal track and partly in the area adjacent thereto on said magnetic media.

4. The apparatus of claim 3 wherein said control means provides a third control signal to cause said positioning means to move said transducer to said nominal track position and said transducer control means causes said transducer positioned at said nominal track positioned to read data recorded partly within said nominal track on said magnetic media.

5. The apparatus of claim 3 wherein said transducer positioning means comprises:

a stepping motor; and a lead screw carrying said transducer and connected to be driven by said stepping motor.

* * * * *